Feb. 20, 1940. A. B. POOLE 2,191,220
FIELD-STRUCTURE FOR SYNCHRONOUS-ELECTRIC MOTORS
Original Filed Dec. 3, 1937 2 Sheets-Sheet 1
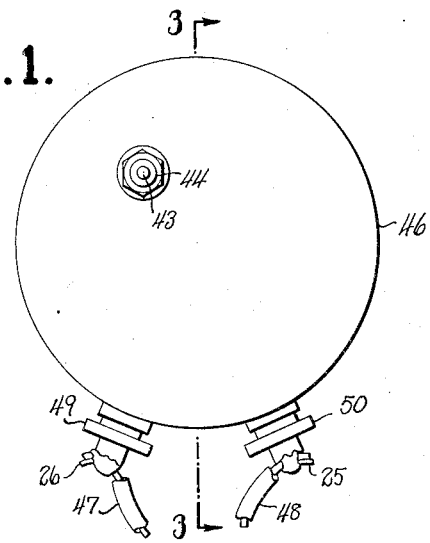
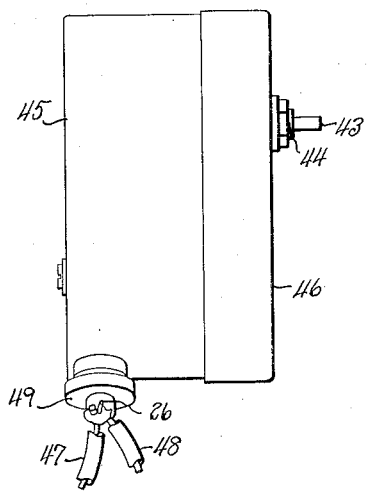
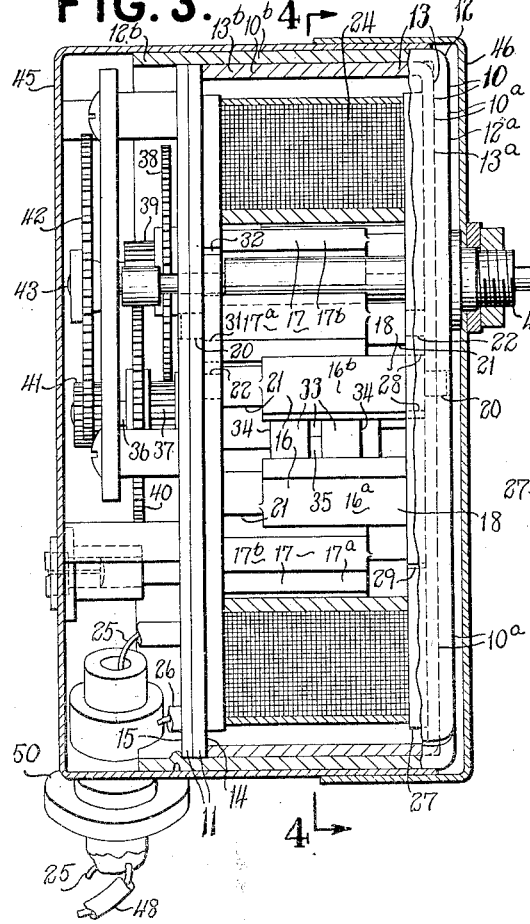
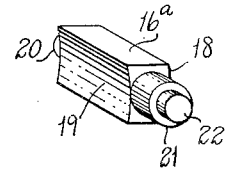
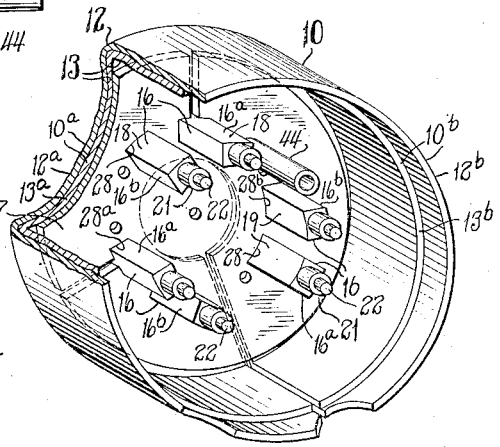
INVENTOR
Arthur B. Poole
BY
Seymour Earle Nichols
ATTORNEY Feb. 20, 1940.   A. B. POOLE   2,191,220
FIELD-STRUCTURE FOR SYNCHRONOUS-ELECTRIC MOTORS
Original Filed Dec. 3, 1937   2 Sheets-Sheet 2
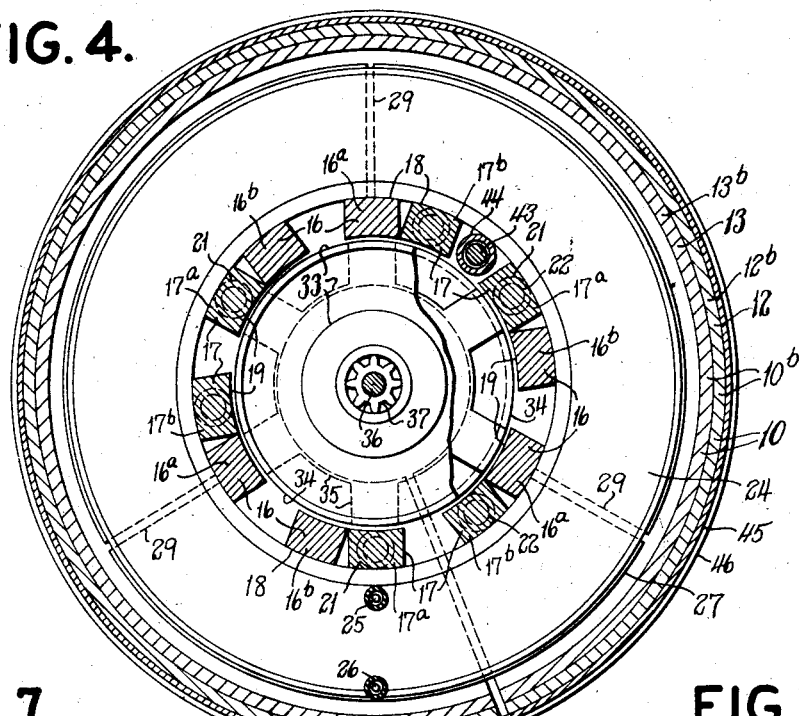
INVENTOR
Arthur B. Poole
BY
ATTORNEY Patented Feb. 20, 1940

2,191,220

UNITED STATES PATENT OFFICE 2,191,220

FIELD-STRUCTURE FOR SYNCHRONOUS-ELECTRIC MOTORS

Arthur B. Poole, Bristol, Conn., assignor to The E. Ingraham Company, Bristol, Conn., a corporation of Connecticut Original application December 3, 1937, Serial No. 177,839. Divided and this application April 29, 1938, Serial No. 204,934

10 Claims. (Cl. 172—278)

This invention relates to an improvement in field-structures for synchronous electric motors and is primarily concerned with field-structures for synchronous-electric motors of the type commonly used in propelling clocks and other time-instruments, and constitutes a division of my co-pending application Serial No. 177,839, filed December 3, 1937.

One of the objects of the present invention is to provide a superior field-structure for synchronous-electric motors which may be relied upon to provide ample synchronous torque and self-starting torque in such proportion as will avoid one of the said torques so dominating the other as to result in the locking of the rotor, sub-synchronous speed or overrunning.

A further object is to provide a superior field-structure for synchronous-electric motors characterized by compactness and ease and facility of assembly.

Another object of the present invention is to provide a superior field-structure having capacity for producing a rotating-field effect to provide for the supplying of self-starting torque and which is characterized by having its salient poles interpositioned in such manner as to provide both synchronous torque and self-starting torque of substantially-constant relative force, despite variations in the voltage impressed upon the energizing-coil.

With the above and other objects in view as will appear to those skilled in the art from the present disclosure, this invention includes all features in the said disclosure which are novel over the prior art and which are not claimed by me in a separate application.

As will be more fully apparent from the following, the present invention contemplates a field-structure having a novel arrangement and interrelationship of its salient poles.

In the accompanying drawings, in which certain modes of carrying out the present invention are shown for illustrative purposes:

Fig. 1 is a view in front-end elevation of a synchronous-electric motor embodying the field-structure of the present invention;

Fig. 2 is a view thereof in side elevation;

Fig. 3 is a view of the motor-structure, partly in side elevation and partly in transverse section, taken on the line 3—3 of Fig. 1;

Fig. 4 is a sectional view taken on the line 4—4 of Fig. 3, with the energizing-coil and the rotor-unit in rear elevation;

Fig. 5 is a perspective view, partly in section, of the cup-shaped pole-unit;

Fig. 6 is a perspective view of the disk-like pole-unit;

Fig. 7 is a perspective view of the shading-disk of the cup-shaped pole-unit;

Fig. 8 is a similar view of the shading-disk of the disk-like pole-unit; and

Fig. 9 is a perspective view of one of the salient poles.

In accordance with the purposes of the present invention, there is provided a field-structure which operates to establish a rotating-field effect as well as a synchronous effect of such nature as to provide both synchronous torque and self-starting torque, which despite voltage changes are maintained in such relative proportions as to result in an electric motor-structure which may be relied upon to operate at uniform speed.

The field-structure by which the above results are arrived at comprises two magnetic-portions which extend in substantial parallelism and from each of which projects groups of pairs of salient poles magnetically coupled to their respective magnetic-portions and arranged in a novel manner, as will more fully hereinafter appear.

In the particular form of the present invention here selected for illustration, the two magnetic-portions of the field-structure comprise a cup-shaped pole-unit, designated as a whole by the reference character 10, and a complementary disk-like pole-unit, designated in general by the reference character 11.

The cup-shaped pole-unit 10, above referred to, may be said to comprise in general a disk-like end-wall 10ᵃ which may be viewed as a magnetic-portion complementing the disk-like pole-unit or magnetic-portion 11, and a flange 10ᵇ projecting rearwardly from the said end-wall 10ᵃ. The cup-shaped pole-unit 10 now being described is composed of a relatively-deep outer cup-shaped member designated as a whole by the reference character 12 and an inner, relatively-shallow cup-shaped member generally designated by the reference character 13. The outer cup-shaped member 12, just above referred to, includes a disk-like end-wall 12ᵃ and a rearwardly-extending annular flange 12ᵇ. Similarly, the inner cup-shaped member 13 which is snugly fitted within the outer cup-shaped member 12, comprises a disk-like end-wall 13ᵃ and a rearwardly-projecting annular flange 13ᵇ which terminates short of the outer end of the flange 12ᵇ of the cup-shaped member 12, as is clearly shown in Figs. 3 and 5.

The disk-like pole-unit 11 comprises an inner disk 14 and an outer disk 15, both of which are installed within the open outer end of the cup-shaped pole-unit 10 so that the said inner disk 14 is in engagement with the outer end of the annular flange 13ᵇ of the inner cup-shaped member 13 of the pole-unit 10 in a position forwardly of the plane of the rear end of the annular flange 12ᵇ of the outer member 12 of the said cup-shaped pole-unit 10.

The cup-shaped members 12 and 13 and the disk-like members 14 and 15 are composed of suitable magnetic material such, for example, as soft iron, silicon steel, or the like.

Magnetically coupled to each of the pole-units 10 and 11, above referred to, are salient poles which are formed of suitable magnetic material and which are adapted to be magnetized by means of an energizing-coil, as will more fully hereinafter appear.

In the form of the invention illustrated, an annularly-arranged series of three (more or less) pairs of salient poles 16 projects rearwardly from the disk-like end-wall 10ᵃ of the cup-shaped pole-unit 10. In a similar manner, an annularly-arranged series of three (more or less) pairs of salient poles 17 is carried by and projects forwardly from the disk-like pole-unit 11.

As shown, see Figs. 5 and 6, each of the magnetic-portions, or pole-units 10 and 11, is provided with six salient poles which are arranged in three corresponding pairs 16 and 17 respectively. The arrangement of the groups of pairs of salient poles of each of the said pole-units about the axis of the structure formed by the complemental pole-units 10 and 11, is such that the individual salient poles of each pair are closely adjacent and each of the pairs of salient poles of each of the said pole-units is more widely spaced with respect to its neighboring pairs of salient poles. The relatively-widely-spaced pairs of salient poles 16 of the cup-shaped pole-unit 10 are arranged in staggered relation with respect to the relatively-widely-spaced pairs of salient poles 17 of disk-like pole-unit 11, and the wide spaces between the pairs of salient poles of each pole-unit provides gaps for the accommodation respectively of the pairs of salient poles of the complemental pole-unit.

In the preferred arrangement, the pairs of salient poles 16 and 17 correspond to each other in size and form and are interchangeable for the purpose of economy of manufacture. Also, in the illustrated embodiment of the invention each of the salient poles throughout the major portion of its length is of substantially-rectangular form in cross-section, but is preferably formed with a slightly-convex outer face 18 and a slightly-concave inner face 19, both of which faces extend substantially concentric with the axis of the field-structure. At one end each of the salient poles is formed with a cylindrical shank 20 which extends with a drive fit into a suitable perforation in the disk-like structure of its particular pole-unit, to firmly anchor the particular salient pole in place. The projecting ends of the salient poles may, if desired and as shown, be formed with a relatively-large cylindrical portion 21 and a relatively-small cylindrical stabilizing-tenon 22.

Located between the end-wall 10ᵃ of the cup-shaped pole-unit 10 and the disk-like pole-unit 11, and within the flange 10ᵇ of the said cup-shaped pole-unit 10, is a ring-like energizing coil 24. The ring-like energizing-coil 24 is carried on the convex outer faces 18 of the two interfitting annular series of pairs of salient poles 16 and 17, and is provided with two insulated leads 25 and 26, which may be connected with a source of current supply in any well-known manner.

Means are provided whereby a rotating-field effect is established in the field-structure, and in the arrangement shown, this result is accomplished by short-circuiting means which extend about one individual salient pole of each of the pairs of salient poles 16 and 17 of the respective pole-units 10 and 11.

In the preferred embodiment of the invention, a shading-disk 27 formed of copper or other material of high electrical conductivity, is positioned against the inner face of the end-wall 10ᵃ of the cup-shaped pole-unit 10 and is formed with an annular series of substantially-rectangular perforations 28, each of which is so shaped and arranged as to snugly fit over the base-portion of one of the salient poles of the cup-shaped pole-unit 10. As is shown particularly well in Figs. 5 and 7, each alternate one 28ᵃ of the polygonal perforations 28 is intersected by a radial slot 29. In this manner, the flow of induced current in the portion of the shading-disk 27 which surrounds each salient pole 16ᵃ of each pair 16 of the said cup-shaped pole-unit, is interrupted. The remaining three perforations 28ᵇ are not intersected by radial slots and the material of the said shading-disk surrounding the salient poles 16ᵇ of the pairs 16 is continuous and provides a low-resistance electrical path for the flow of induced current around the particular three said salient poles 16ᵇ, which project through the non-intersected perforations 28ᵇ.

A shading-disk 30 corresponding in its main features and functions to the shading-disk 27, is located against the inner face of the disk 14 of disk-like pole-unit 11 and is also provided with six substantially-rectangular perforations 31, each of which snugly fits over the base-portion of one individual of each pair of salient poles 17 of the said disk-like pole-unit. As is clearly shown in Figs. 6 and 8, each alternate one of the polygonal perforations 31 designated 31ᵃ is intersected by a radial slot 32, which serves to interrupt the flow of induced current in the portion of the shading-disk 30 adjacent each of the said salient poles 17ᵃ of the disk-like pole-unit 11 of the field-structure. The remaining three perforations, indicated at 31ᵇ are not intersected by radial slots and a low-resistance electrical path is thus provided in the portion of shading-disk 30 surrounding each of the said salient poles 17ᵇ which passes through a non-intersected perforation of the said shading-disk 30.

From the foregoing, it will be apparent that when the energizing-coil 24 receives current and causes magnetic-flux to flow through the salient poles of the pole-units 10 and 11, the flow of induced current in the portions of the shading-disks 27 and 30 which surround the salient poles 16ᵇ and 17ᵇ, respectively, will interfere with the flow of magnetic-flux through these salient poles and the flux will lag with respect to the magnetic-flux flowing through the salient poles 16ᵃ and 17ᵃ of the pole-units 10 and 11, which last-named salient poles pass through the intersected perforations of the shading-disks 27 and 30, respectively. In this manner a rotating-field effect is produced and self-starting torque is developed.

It is also the feature of the invention to provide a novel arrangement of the salient poles of the pole-units, whereby synchronous running torque is provided which will bear such relation to self-starting torque as to avoid possible locking or overrunning.

As has been described and as is particularly well shown in Fig. 4, the individual salient poles of any given pair thereof of either the said pole-units are arranged relatively close to each other, and each of the pairs of salient poles is more widely spaced with respect to its neighboring pairs of the same pole-unit. This arrangement provides between the respective pairs of salient poles of each pole-unit a relatively-wide gap for the accommodation of the respective pairs of salient poles of the complemental pole-unit. When the pairs of salient poles of each pole-unit are fitted into the gaps between the respective pairs of salient poles of the other pole-unit, the arrangement is such that the salient poles of like polarity are spaced relatively-widely apart, while the salient poles of unlike polarity are spaced in close proximity to each other.

The magnetic-flux flowing through the salient poles of the pole-units acts on and drives a rotor-unit, which, in turn, drives a train of mechanism, including speed reduction gearing and a power-output shaft.

The particular arrangements of the rotor-unit and associated mechanism form no essential part of this invention and will be but briefly described here.

The rotor-unit, generally designated by the reference character 33, has rigidly mounted on a hub of the rotor-unit a pair of corresponding but oppositely-facing rotor-elements 34—34, preferably formed of permanent-magnet steel or the like and spaced from each other by a salient-poled rotor-element 35 composed of soft iron or other non-permanent-magnetic material. The rotor-elements 34, owing to their permanent-magnet character, are adapted to receive magnetic "spottings," which will be impressed upon them by the adjacent salient poles of the field-structure, in accordance with well understood principles in the art.

Extending axially through the rotor-unit 33 is a center-arbor 36. The rotor-unit 33 carries a pinion 37 which bears with freedom for rotation upon the said center-arbor 36 and meshes into and drives a gear-wheel 38. The gear-wheel 38 rigidly carries a pinion 39 which, in turn, drives a gear-wheel 40 secured on the said center-arbor 36. Secured to the rear of the said center-arbor 36 is a pinion 41 which meshes with and drives a gear-wheel 42. The said gear-wheel 42 is staked or otherwise secured to the rear end of a power-output shaft 43 which extends forwardly through a bearing-bushing 44, which in turn passes through and is rigidly mounted in the end-wall 10ª of the cup-shaped pole-unit 10.

It will be apparent from the foregoing description that there is provided a particularly advantageous field-structure, especially with respect to the interfitting arrangement of the pairs of salient poles, in which the pairs of salient poles of each of the two pole-units project toward the complemental pole-unit and into gaps provided between the pairs of salient poles of each pole-unit to accommodate the pairs of salient poles of the other pole-unit. These features, together with the short-circuiting means provided for the magnetic circuit of alternate salient poles of the pairs of salient poles of each pole-unit, provide simple and efficient means for producing a rotating-field effect and developing and maintaining self-starting torque and synchronous torque of substantially-definite relative values, to avoid lagging, lock-in or overrunning operation of the rotor.

The use of magnetic-portions comprising a cup-shaped pole-unit and a disk-like pole-unit provides other desirable operating arrangements. The end-wall 10ª of the cup-shaped pole-unit 10 serves as a disk-like magnetic-portion similar to the disk-like pole-unit 11, and to the disk-like portion of the said cup-shaped pole-unit the salient poles 16 are magnetically coupled. The outer edge of the flange 13ᵇ of the inner cup-shaped member 13, as described, is engaged by the inner surface of the inner disk 14, and the said flange serves as a spacing-element inasmuch as it holds the two pole-units in spaced relationship and, together with the flange 12ᵇ, provides a magnetic path between the disk-like portions of the respective pole-units. The two pole-units 10 and 11 comprise a complete magnetic-frame, within which the energizing-coil 24 and the rotor-unit 33 of the structure are contained.

In providing arrangements whereby the described electromagnetic functions are carried out in a superior manner, the invention has contemplated other desirable arrangements in accomplishing these results.

As will be clear from the description and the drawings, the disk-like pole-unit 11 fits within the open forward end of the flange 12ᵇ of the outer cup-shaped member 12 of the cup-shaped pole-unit 10, and is held in such spaced relationship with respect to the end-wall 10ª of the said cup-shaped pole-unit by the flange 13ᵇ so as to accommodate the rotor-unit and other elements of the field-structure. The salient poles correspond as to size and form and are inter-changeable, and are further arranged in an annular series in the disk-like portions of the respective pole-units in which they are carried. As has been described, the pairs of salient poles of one pole-unit are accommodated between the pairs of salient poles of the other pole-unit to form a single annular series of salient poles.

From the above description it will be seen that the field-structure of my invention is comprised of few parts and that the pole-units can be easily assembled without particular skill being required. And that when the two pole-units are assembled they comprise a compactly-arranged, securely-held, unitary field-structure.

Preferably, in completely-assembled form, the field-structure is contained in a sealing-housing comprising a cup-shaped housing-member 45, the forward or open end of which is closed by a flanged housing-cap 46 having an annular flange which fits over the exterior of the adjacent end of the flange of the cup-shaped housing-member 45.

The leads 25 and 26 of the energizing-coil 24 may be connected to exterior supply-wires 47 and 48 respectively, through terminal-fittings 49 and 50, as shown, or by any other suitable means. The supply-wires 47 and 48 may lead to a source of alternating-current supply of commercial voltage and frequency.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A field-structure for synchronous-electric motors including in combination: a first magnetic-portion; a second magnetic-portion spaced from the said first magnetic portion and extending in substantial parallelism therewith; magnetic-means extending between the said magnetic-portions at the outer portions thereof, the said magnetic-means acting to space the said magnetic-portions apart and coacting therewith to provide a magnetic-frame; an energizing-coil for magnetizing the two said magnetic-portions with opposite instantaneous polarity respectively; a first group of pairs of salient poles magnetically coupled to the said first magnetic-portion and projecting therefrom in the direction of the said second magnetic-portion; and a second group of pairs of salient poles magnetically coupled to the said second magnetic-portion and extending therefrom in the opposite direction toward the said first magnetic-portion; the oppositely-projecting groups of salient poles being coupled to the respective magnetic-portions inwardly of the outer portions thereof and of the said magnetic-means extending therebetween to project within the said magnetic-frame; the individual salient poles of each pair of a given magnetic-portion being more closely spaced together than are the said pairs with respect to an adjacent pair of the given magnetic-portion, thereby providing a gap between the respective pairs of salient poles of each of said magnetic-portions for the accommodation of a pair of salient poles of the other of said magnetic-portions.

2. A field-structure for synchronous-electric motors including in combination: a first magnetic-portion; a second magnetic-portion spaced from the said first magnetic-portion and extending in substantial parallelism therewith; magnetic-means extending between the said magnetic-portions at the outer portions thereof, the said magnetic-means acting to space the said magnetic-portions apart and coacting therewith to provide a magnetic-frame; an energizing-coil for magnetizing the two said magnetic-portions with opposite instantaneous polarity respectively; a first group of pairs of salient poles magnetically coupled to the said first magnetic-portion and projecting therefrom in the direction of the said second magnetic-portion; a second group of pairs of salient poles magnetically coupled to the said second magnetic-portion and extending therefrom in the opposite direction toward the said first magnetic-portion; the oppositely-projecting groups of salient poles being coupled to the respective magnetic-portions inwardly of the outer portions thereof and of the said magnetic-means extending therebetween to project within the said magnetic-frame; the individual salient poles of each pair of a given magnetic-portion being more closely spaced together than are the said pairs with respect to an adjacent pair of the given magnetic-portion, thereby providing a gap between the respective pairs of salient poles of each of said magnetic-portions for the accommodation of a pair of salient poles of the other of said magnetic-portions; and short-circuiting means extending around but one individual salient pole of each of the said pairs thereof to provide a rotating-field effect.

3. A field-structure for synchronous-electric motors including in combination: a first magnetic-portion; a second magnetic-portion spaced from the said first magnetic-portion and extending in substantial parallelism therewith; magnetic means extending between the said magnetic-portions at the outer portions thereof, the said magnetic-means acting to space the said magnetic-portions apart and coacting therewith to provide a magnetic-frame; an energizing-coil for magnetizing the two said magnetic-portions with opposite instantaneous polarity respectively; a first group of pairs of salient poles magnetically coupled to the said first magnetic-portion and projecting therefrom in the direction of the said second magnetic-portion; a second group of pairs of salient poles magnetically coupled to the said second magnetic-portion and extending therefrom in the opposite direction toward the said first magnetic-portion; the oppositely-projecting groups of salient poles being coupled to the respective magnetic-portions inwardly of the outer portions thereof and of the said magnetic-means extending therebetween to project within the said magnetic-frame; the individual salient poles of each pair of a given magnetic-portion being more closely spaced together than are the said pairs with respect to an adjacent pair of the given magnetic-portion, thereby providing a gap between the respective pairs of salient poles of each of said magnetic-portions for the accommodation of a pair of salient poles of the other of said magnetic-portions; and a pair of disk-like short-circuiting members respectively located closely adjacent each of the said magnetic-portions, each of the said short-circuiting members being perforated to fit over the salient poles of its adjacent magnetic-portion and providing a low electrical-resistance path around but one individual salient pole of each of the said pairs thereof to provide a rotating-field effect.

4. A field-structure for synchronous-electric motors including in combination: a first disk-like magnetic-portion; a second disk-like magnetic-portion spaced from the said first disk-like magnetic-portion and extending in substantial parallelism therewith; magnetic-means carried by the first disk-like magnetic-portion adjacent the periphery thereof and extending laterally therefrom to be engaged by the said second disk-like magnetic-portion, the said magnetic-means acting to hold the two said magnetic-portions in spaced relationship and also coacting therewith to provide a magnetic-frame; an energizing-coil located between the two said disk-like magnetic-portions and within the said magnetic-frame; a first group of pairs of salient poles magnetically coupled to the first said magnetic-portion and projecting therefrom in the direction of the said second magnetic-portion; and a second group of pairs of salient poles magnetically coupled to the said second magnetic-portion and extending therefrom in the opposite direction toward the said first magnetic-portion; the oppositely-projecting groups of salient poles being coupled to the respective magnetic-portions in radially-inwardly spaced relation to the said magnetic-means and being thereby also located within the said magnetic-frame; the individual salient poles of each pair of a given magnetic-portion being more closely spaced together than are the said pairs with respect to an adjacent pair of the given magnetic-portion, thereby providing a gap between the respective pairs of salient poles of each of said magnetic-portions for the accommodation of a pair of salient poles of the other of said magnetic-portions.

5. A field-structure for synchronous-electric motors including in combination: a first disk-like magnetic-portion; a second disk-like magnetic-portion spaced from the said first disk-like magnetic-portion and extending in substantial parallelism therewith; magnetic-means carried by the first disk-like magnetic-portion adjacent the periphery thereof and extending laterally therefrom to be engaged by the said second disk-like magnetic-portion, the said magnetic-means acting to hold the two said magnetic-portions in spaced relationship and also coacting therewith to provide a magnetic-frame; an energizing-coil located between the two said disk-like magnetic-portions and within the said magnetic-frame; a first group of pairs of salient poles magnetically coupled to the first said magnetic-portion and projecting therefrom in the direction of the said second magnetic-portion; a second group of pairs of salient poles magnetically coupled to the said second magnetic-portion and extending therefrom in the opposite direction toward the said first magnetic-portion; the oppositely-projecting groups of salient poles being coupled to the respective magnetic-portions in radially-inwardly spaced relation to the said magnetic-means and being thereby also located within the said magnetic-frame; the individual salient poles of each pair of a given magnetic-portion being more closely spaced together than are the said pairs with respect to an adjacent pair of the given magnetic-portion, thereby providing a gap between the respective pairs of polar-projections of each of said magnetic-portions for the accommodation of a pair of salient poles of the other of said magnetic-portions; and short-circuiting means extending around but one individual salient pole of each of the said pairs thereof to provide a rotating-field effect.

6. A field-structure for synchronous-electric motors including in combination: a first disk-like magnetic-portion; a second disk-like magnetic-portion spaced from the said first disk-like magnetic-portion and extending in substantial parallelism therewith; magnetic-means carried by the first disk-like magnetic-portion adjacent the periphery thereof and extending laterally therefrom to be engaged by the said second disk-like magnetic-portion, the said magnetic-means acting to hold the two said magnetic-portions in spaced relationship and also coacting therewith to provide a magnetic-frame; an energizing-coil located between the two said disk-like magnetic-portions and within the said magnetic-frame; a first group of pairs of salient poles magnetically coupled to the first said magnetic-portion and projecting therefrom in the direction of the said second magnetic-portion; a second group of pairs of salient poles magnetically coupled to the said second magnetic-portion and extending therefrom in the opposite direction toward the said first magnetic-portion; the oppositely-projecting groups of salient poles being coupled to the respective magnetic-portions in radially-inwardly spaced relation to the said magnetic-means and being thereby also located within the said magnetic-frame; the individual salient poles of each pair of a given magnetic-portion being more closely spaced together than are the said pairs with respect to an adjacent pair of the given magnetic-portion, thereby providing a gap between the respective pairs of salient poles of each of said magnetic-portions for the accommodation of a pair of salient poles of the other of said magnetic-portions; and a pair of disk-like short-circuiting members respectively located closely adjacent each of the said magnetic-portions, each of the said short-circuiting members being perforated to fit over the salient poles of its adjacent magnetic-portion and providing a low electrical-resistance path around but one individual salient pole of each of the said pairs thereof to provide a rotating-field effect.

7. A field-structure for synchronous electric motors including in combination: a cup-shaped magnetic-member and a disk-like magnetic-member; the said cup-shaped magnetic-member having an end-wall and an annular-flange, the said annular-flange engaging and holding the said disk-like magnetic-member in spaced relationship with respect to the end-wall of the said cup-shaped magnetic-member and also coacting with the said end-wall and with the said disk-like magnetic-member to provide a magnetic-frame; an energizing-coil located within the said magnetic-frame for magnetizing the two said magnetic-members with opposite instantaneous polarity respectively; a first group of pairs of salient poles magnetically coupled to the end-wall of the said cup-shaped magnetic-member and projecting therefrom in the direction of the said disk-like magnetic-member; and a second group of pairs of salient poles magnetically coupled to the said disk-like magnetic-member and extending therefrom in the opposite direction toward the end-wall of the said cup-like magnetic-member; the oppositely-projecting groups of salient poles being coupled to the said end-wall and the said disk-like magnetic-member in radially-inwardly spaced relation to the annular-flange of the cup-shaped magnetic-member and being thereby also located within the said magnetic-frame; the individual salient poles of each pair of a given magnetic-member being more closely spaced together than are the said pairs with respect to an adjacent pair of the given magnetic-portion, thereby providing a gap between the respective pairs of salient poles of each of the said magnetic-members for the accommodation of a pair of salient poles of the other of said magnetic-portions.

8. A field-structure for synchronous electric motors including in combination: a cup-shaped magnetic-member and a disk-like magnetic-member; the said cup-shaped magnetic-member having an end-wall and an annular-flange, the said annular-flange engaging and holding the said disk-like magnetic-member in spaced relationship with respect to the end-wall of the said cup-shaped magnetic-member and also coacting with the said end-wall and with the said disk-like magnetic-member to provide a magnetic-frame; an energizing-coil located within the said magnetic-frame for magnetizing the two said magnetic-members with opposite instantaneous polarity respectively; a first group of pairs of salient poles magnetically coupled to the end-wall of the said cup-shaped magnetic-member and projecting therefrom in the direction of the said disk-like magnetic-member; a second group of pairs of salient poles magnetically coupled to the said disk-like magnetic-member and extending therefrom in the opposite direction toward the end-wall of the said cup-like magnetic-member; the oppositely-projecting groups of salient poles being coupled to the said end-wall and the said disk-like magnetic-member in radially-inwardly spaced relation to the annular-flange of the cup-shaped magnetic-member and being thereby also located within the said magnetic-frame; the individual salient poles of each pair of a given magnetic-member being more closely spaced together than are the said pairs with respect to an adjacent pair of the given magnetic-portion, thereby providing a gap between the respective pairs of salient poles of each of the said magnetic-members for the accommodation of a pair of salient poles of the other of said magnetic-portions; and short-circuiting means extending around but one individual salient pole of each of the said pairs thereof to provide a rotating-field effect.

9. A field-structure for synchronous-electric motors including in combination: a cup-shaped magnetic-member and a disk-like magnetic-member; the said cup-shaped magnetic-member having an end-wall and an annular-flange, the said annular-flange engaging and holding the said disk-like magnetic-member in spaced relationship with respect to the end-wall of the said cup-shaped magnetic-member and also coacting with the said end-wall and with the said disk-like magnetic-member to provide a magnetic-frame; an energizing-coil located within the said magnetic-frame for magnetizing the two said magnetic-members with opposite instantaneous polarity respectively; a first group of pairs of salient poles magnetically coupled to the end-wall of the said cup-shaped magnetic-member and projecting therefrom in the direction of the said disk-like magnetic-member; a second group of pairs of salient poles magnetically coupled to the said disk-like magnetic-member and extending therefrom in the opposite direction toward the end-wall of the said cup-like magnetic-member; the oppositely-projecting groups of salient poles being coupled to the said end-wall and the said disk-like magnetic-member in radially-inwardly spaced relation to the annular flange of the cup-shaped magnetic-member and being thereby also located within the said magnetic-frame; the individual salient poles of each pair of a given magnetic-member being more closely spaced together than are the said pairs with respect to an adjacent pair of the given magnetic-portion, thereby providing a gap between the respective pairs of salient poles of each of the said magnetic-members for the accommodation of a pair of salient poles of the other of said magnetic-portions; and a pair of disk-like short-circuiting members respectively located closely adjacent each of the said magnetic-portions, each of the said short-circuiting members being perforated to fit over the salient poles of its adjacent magnetic-portion and providing a low electrical-resistance path around but one individual salient pole of each of the said pairs thereof to provide a rotating-field effect.

10. A field-structure for synchronous-electric motors including in combination: a laminated cup-shaped pole-unit arranged to carry poles of the field-structure and comprising in turn an outer relatively-deep cup-shaped member and a relatively-shallow inner cup-shaped member fitted into the said outer relatively-deep cup-shaped member and having an annular flange terminating short of the annular flange of the latter; and a complemental disk-like pole-unit also arranged to carry poles of the field-structure fitted within the flange of the said outer relatively-deep cup-shaped member in position immediately adjacent the end of the flange of the said inner relatively-shallow cup-shaped member; the last-named annular-flange acting to space the disk-like pole-unit from the end-wall of the laminated cup-shaped pole-unit and also coacting with the annular-flange of the outer cup-shaped member and with the said end-wall and the said disk-like pole-unit to provide an enclosing magnetic-frame.

ARTHUR B. POOLE.